US012528959B2

(12) United States Patent
Xiao et al.

(10) Patent No.: US 12,528,959 B2
(45) Date of Patent: Jan. 20, 2026

(54) CONDUCTIVE INKS WITH NEOPRENE BINDER

(71) Applicant: NATIONAL RESEARCH COUNCIL OF CANADA, Ottawa (CA)

(72) Inventors: Gaozhi Xiao, Ottawa (CA); Ye Tao, Ottawa (CA); Zhiyi Zhang, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 1120 days.

(21) Appl. No.: 17/286,714

(22) PCT Filed: Oct. 18, 2018

(86) PCT No.: PCT/IB2018/058113
§ 371 (c)(1),
(2) Date: Apr. 19, 2021

(87) PCT Pub. No.: WO2020/079473
PCT Pub. Date: Apr. 23, 2020

(65) Prior Publication Data

US 2021/0355339 A1 Nov. 18, 2021

(51) Int. Cl.
*C09D 11/52* (2014.01)
*A41D 1/00* (2018.01)
(Continued)

(52) U.S. Cl.
CPC .............. *C09D 11/52* (2013.01); *A41D 1/002* (2013.01); *A61B 5/0816* (2013.01);
(Continued)

(58) Field of Classification Search
CPC ............ C09D 11/00–52; C09D 11/037; C09D 11/106; C09D 11/52; A41D 1/00–005;
(Continued)

(56) References Cited

U.S. PATENT DOCUMENTS 2,823,146 A * 2/1958 Roberts .................. H05K 1/095
106/287.18
3,228,897 A 1/1966 Nellessen
(Continued)

FOREIGN PATENT DOCUMENTS

CN 106995625 A * 8/2017
CN 107903692 A 4/2018
(Continued)

OTHER PUBLICATIONS

English translation of KR 20190135732 A, Korea Institute of Science and Technology, 16 pages, printed on Feb. 29, 2024, (Year: 2019).*

(Continued)

*Primary Examiner* — Eric F Winakur
*Assistant Examiner* — Noah M Healy
(74) *Attorney, Agent, or Firm* — PERRY + CURRIER INC.

(57) ABSTRACT

A stretchable and/or flexible conductive ink has conductive particles admixed with a binder comprising a neoprene. The mass of the conductive particles in the ink is in a range of 6.0 to 10.4 times greater than the mass of the neoprene in the ink. When deposited on a substrate, the ink provides suitably stretchable and flexible conductive elements. The conductive elements may be stretchable, flexible electronic and/or thermal devices.

20 Claims, 1 Drawing Sheet

(51) Int. Cl.
  *A61B 5/00* (2006.01)
  *A61B 5/08* (2006.01)
  *C09D 11/037* (2014.01)
  *C09D 11/106* (2014.01)
  *D06P 1/52* (2006.01)
  *D06P 1/673* (2006.01)

(52) U.S. Cl.
  CPC .......... *A61B 5/6804* (2013.01); *C09D 11/037* (2013.01); *C09D 11/106* (2013.01); *D06P 1/5242* (2013.01); *D06P 1/673* (2013.01); *A61B 2562/166* (2013.01)

(58) Field of Classification Search
  CPC ............... A41D 1/002; A61B 5/0816; A61B 5/6801–6829; A61B 2562/164–166; A61B 2562/12; A61B 5/6804; A61B 2562/166; D06P 1/5242; D06P 1/00–965; D06P 1/44; D06P 1/5221; D06P 1/673; D06M 11/83; D06M 23/00–08; D06M 15/693; D06M 23/16; D06M 23/08
  See application file for complete search history.

(56) References Cited

U.S. PATENT DOCUMENTS

| | | | |
|---|---|---|---|
| 4,015,046 A | 3/1977 | Pinkston et al. | |
| 4,487,811 A | 12/1984 | Eichelberger et al. | |
| 4,552,690 A | 11/1985 | Ikeguchi et al. | |
| 5,989,700 A | 11/1999 | Krivopal | |
| 6,663,799 B2 | 12/2003 | Kokubo et al. | |
| 8,339,040 B2 | 12/2012 | Bruton et al. | |
| 8,945,328 B2 | 2/2015 | Longinotti-Buitoni et al. | |
| 8,948,839 B1 | 2/2015 | Longinotti-Buitoni et al. | |
| 9,187,657 B2 | 11/2015 | Yano et al. | |
| 9,460,824 B2 | 10/2016 | Liu et al. | |
| 2005/0023527 A1* | 2/2005 | Kondo | B41M 1/34 257/59 |
| 2005/0070629 A1 | 3/2005 | Roberts | |
| 2015/0040282 A1 | 2/2015 | Longinotti-Buitoni et al. | |
| 2016/0095547 A1 | 4/2016 | Wang et al. | |
| 2018/0134909 A1 | 5/2018 | Paquet et al. | |
| 2019/0132948 A1* | 5/2019 | Longinotti-Buitoni | A61B 5/6805 |

FOREIGN PATENT DOCUMENTS

| | | | | |
|---|---|---|---|---|
| CN | 108530999 A | | 9/2018 | |
| KR | 20190135732 A | * | 12/2019 | .............. B41M 5/36 |
| WO | WO-2009079004 A1 | | 6/2009 | |
| WO | WO-2017112628 A1 | * | 6/2017 | ............ C08F 120/14 |
| WO | WO-2018228407 A1 | * | 12/2018 | ............ C09D 11/104 |

OTHER PUBLICATIONS

English translation of CN 106995625 A, Micron Optoelectronics Co., Ltd., 6 pages, printed on Feb. 29, 2024, (Year: 2017).*
English translation of WO 2018228407 A1, Xiamen Xindeco IOT & Optpelectronics Technology Institute Co., Ltd., 10 pages printed on Feb. 29, 2024, (Year: 2018).*

* cited by examiner

CONDUCTIVE INKS WITH NEOPRENE BINDER

FIELD

This application relates to conductive inks, particularly printable conductive inks.

BACKGROUND

Stretchable and/or flexible conductors form the basis of many types of smart fabrics, smart skins, wearables and IOT applications. There is a growing demand for conductive inks suitable for printing processes, such as screen printing, which provide stretchable and/or flexible conductive elements when deposited on a substrate.

There remains a need for an ink capable of producing reliably stretchable and/or flexible conductive elements when deposited on a substrate.

SUMMARY

In one aspect, there is provided a stretchable and/or flexible conductive ink comprising conductive particles admixed with a binder comprising a neoprene, the conductive particles having a mass in the ink in a range of 6.0 to 10.4 times greater than a mass of the neoprene in the ink.

In another aspect, there is provided a substrate comprising a stretchable and/or flexible conductive element thereon, the conductive element produced from the ink as defined above deposited on the substrate.

In another aspect, there is provided a garment comprising the substrate as defined above.

The conductive ink comprising conductive metal particles and a binder comprising neoprene in a relative amount specified herein provides superior reliability and processability at low cost, while being conductive as well as stretchable and/or flexible when deposited on a substrate. The deposited and dried ink is washable making the ink particularly useful for depositing on fabrics used in the garment industry.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
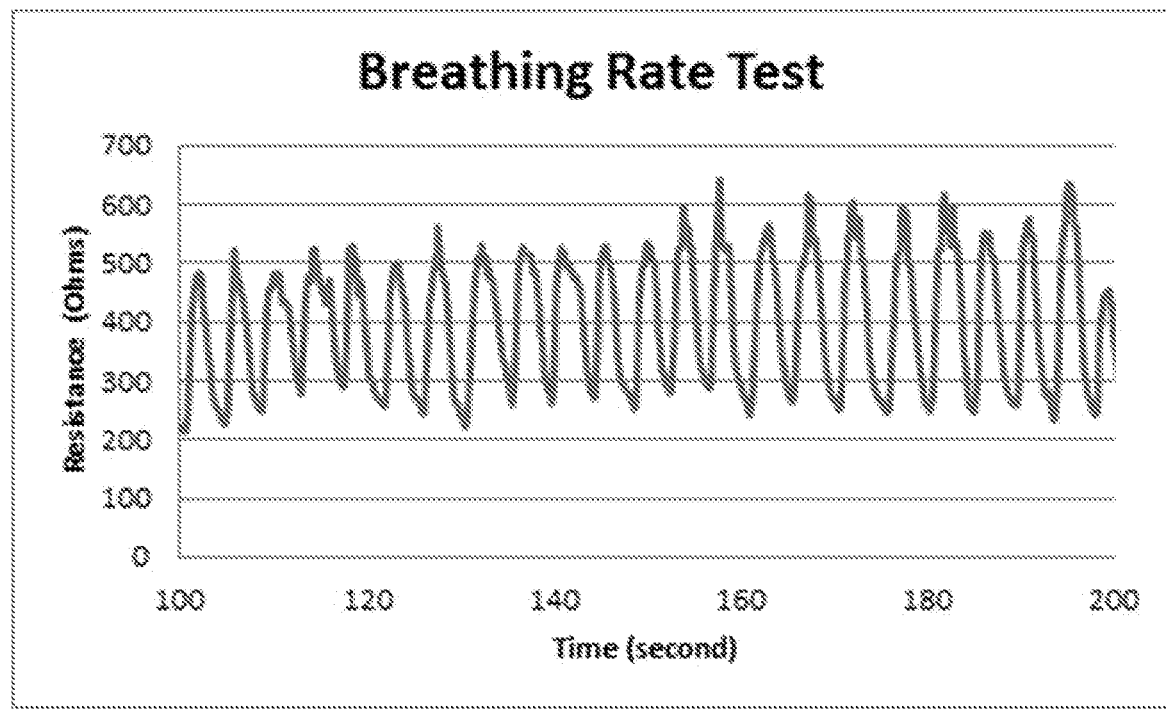
FIG. 1 is a graph of resistance (Ω) vs. time (s) for a breathing rate test of a breathing rate sensor fabricated from an ink of the present invention and affixed to a non-stretchable strap.

The binder comprises neoprene. Neoprene, also known as polychloroprene, is a family of synthetic rubbers that are produced by polymerization of chloroprene (2-chlorobuta-1,3-diene, $CH_2=CCl-CH=CH_2$). Neoprene exhibits good chemical stability and maintains stretchability and flexibility over a wide temperature range. For example, neoprene may have a glass transition temperature of about −36° C. with temperature stability up to about 200° C. Neoprene may be linear or crosslinked. Linear neoprene is particularly preferred. The binder may further comprise one or more additives to improve stability of the ink and/or deposited conductors before and/or after deposition of the ink on a substrate. Additives may include, for example, stabilizers, plasticizers, dispersants, adhesion promoters and the like.

The conductive particles may comprise any electrically and/or thermally conductive material, for example one or more of a metal (e.g. silver (Ag), gold (Au), copper (Cu), platinum (Pt), etc.), carbon nanotubes (e.g. SWCNT, MWCNT, etc.) or graphene. Conductive metal particles or graphene are preferred. Silver particles are most preferred. The conductive particles may comprise one or more different shapes, for example flakes, spheres, nanowires, etc. The conductive particles are preferably nanosized with an average size of a longest dimension in a range of about 1-10,000 nm, more preferably about 500-6,000 nm or about 2,000-4,000 nm. The conductive particles are preferably at least electrically conductive. Different shapes and different sizes of the conductive particles are preferred in order to improve contact between the conductive particles. In a preferred embodiment, the conductive particles are shaped as flakes, powders or a combination thereof.

The conductive particles are present in the ink in an amount of 6.0 to 10.4 times greater than an amount of the neoprene in the ink, based on weight. Preferably, the mass of conductive particles is no more than 10.0 times the mass of the neoprene, more preferably no more than 10.0 times the mass of the neoprene, even more preferably no more than 9.2 times the mass of the neoprene. Preferably, the mass of conductive particles is no less than 6.2 times the mass of the neoprene, more preferably no less than 6.4 times the mass of the neoprene, more preferably no less than 6.6 times the mass of the neoprene. More preferably, the conductive particles and neoprene are present in a weight ratio (w/w) of conductive particles to neoprene in a range of 6.4 to 10.0 (w/w), even more preferably 6.6 to 9.2 (w/w). It has been found that when the mass of conductive particles is less than 6.0 times the mass of neoprene or when the mass of conductive particles is greater than 10.4 times the mass of neoprene, the resulting inks when deposited and dried on a substrate do not provide elements on the substrate, which are sufficiently stretchable or conductive. Therefore, the relative amounts of conductive particles to neoprene in the ink is important for providing an ink that produces suitably conductive and stretchable and/or flexible elements. In particular, control of the relative amounts of conductive particles and neoprene as described herein provides an ink that produces suitably stretchable and flexible conductive elements when deposited on a substrate.

The conductive particles and neoprene may be formulated into an ink by admixing the conductive particles and neoprene with a suitable solvent. The solvent may be an aqueous medium, an organic medium or a mixture thereof. The solvent may be polar or non-polar. Organic solvents may be aromatic or aliphatic. Organic solvents include, for example, alcohol-based solvents, diol-based solvents, ketone-based solvents, ester-based solvents, ether-based solvents, aliphatic or alicyclic hydrocarbon-based solvents, aromatic hydrocarbon-based solvents, cyano-containing hydrocarbon solvents, and other solvents. Suitable solvents are generally known, such as the solvents disclosed in US 2018/0134909 published May 17, 2018, which is incorporated herein by reference. The solvent may be present in the ink in an amount of about 1-99 wt % of the ink, based on weight of the ink. Preferably, the ink comprises about 5-95 wt %, or about 10-90 wt %, or about 20-80 wt % of the ink. The solvent generally makes up the balance of the ink after including all other components of the ink.

The ink may be deposited on a substrate by any suitable method. The ink may be deposited in traces that form a desired conductive element. Printing is a particularly preferred method of deposition. Common printing methods for ink compositions include, for example, screen printing, inkjet printing, flexography printing (e.g. stamps), gravure printing, off-set printing, airbrushing, aerosol printing, typesetting, or any other method. After printing, the ink composition may be dried or cured, for example by allowing the ink composition to dry in ambient conditions or heating the ink composition for an appropriately long period of time to evaporate the solvent. The ink compositions are particularly suited to screen printing.

The ink may be used to produce stretchable and/or flexible electrically or thermally conductive elements on a substrate. After deposition of the ink on the substrate, the ink may be dried by removing the solvent to produce the stretchable and/or flexible conductive element on the substrate. Drying may be performed at any suitable temperature and pressure for any suitable length of time. Drying is generally performed under conditions that do not result in degradation of the neoprene. Drying is preferably done in a temperature range of from about 60° C. to about 200° C., more preferably in a range of about 100° C. to about 150° C. Drying time is preferably in a range of about 1 minute to about 30 minutes. Pressure applied to the conductive ink trace is preferably in a range of about 10 psi (68.9 kPa) to about 2,000 psi (13,790 kPa), more preferably about 100 psi (689 kPa) to about 1,000 (6,890 kPa) psi. The utilization of pressure is not necessary but it will help improving the electrical conductivity of the deposited conductive traces.

In a preferred embodiment, the ink consists essentially of the conductive particles, the binder and the solvent. After deposition and drying, the conductive element would consist essentially of the conductive particles and the binder.

Any desired substrate may be used. The ink is particularly useful on stretchable and/or flexible substrates. Some suitable substrates include, for example, polyethylene naphthalate (PEN), polyethylene terephthalate (PET) (e.g. Melinex™), PEN-PET, polyolefin (e.g. silica-filled polyolefin (Teslin™)), polydimethylsiloxane (PDMS), polystyrene, polycarbonate, polyimide (e.g. Kapton™), silicone rubber, natural rubber, neoprene rubber and other types of rubbers, other elastomers including TPU (thermoplastic polyurethane), textiles (e.g. cellulosic textiles, synthetic textiles), paper, glass, metal, dielectric coatings, among others.

Conductive elements may be electronic and/or thermal devices or parts of electronic and/or thermal devices. Some examples of conductive elements include, for example, sensors (e.g. respiratory rate sensors), energy harvesters (e.g. generators), near field communication devices (NFCs), piezoelectric devices, triboelectric devices, thermal devices, electrical connection traces, antennas, batteries, supercapacitors, memories, etc.

EXAMPLES

Example 1

Ink samples as listed in Table 1 were prepared by mixing silver particles with neoprene particles and additives in a solvent, as follows. The neoprene particles were first dissolved in 2-ethylhexyl acetate at ambient temperature, the mixing process taking 1-10 days depending on the amount and the dimensions of the neoprene particles. Then the neoprene solution is mixed with the additives using a "SpeedMixer" (from FlackTek™) based on the principle of Dual Asymmetric Centrifugal Mixing. Both tris(nonyphenyl)phosphite and Vikoflex™ 7170 epoxidized oil are additives used to improve the stability of the ink and the deposited conductors during and after the processing.

Tris(nonylphenyl)phosphite (Sigma-Aldrich): 0.75 g
Vikoflex™ 7170 Epoxidized oil: 2 g
Silver powder (2-4 microns): in an amount to provide the Ag:Neoprene ratio
2-Ethylhexyl acetate (Sigma-Aldrich): 20 g The ink samples were then screen printed on natural rubber substrate surfaces and dried at 120° C. for 15 minutes to form 5 cm long traces on the substrates. The dried traces were then tested for electrical conductivity (resistance) and stretchability. Stretchability was judged by whether the conductor would lose conductivity when stretched by 31% of the conductor's original length. Over-stretching would cause the conductor to break, the break causing the conductor to become non-conductive.

It is evident from Table 1 that inks in which the weight ratio of silver to neoprene is 5.9 w/w or less do not produce traces having sufficient conductivity. It is also evident from Table 1 that that inks in which the weight ratio of silver to neoprene is 10.5 w/w or more do not produce traces having sufficient stretchability. Only inks where the weight ratio of silver to neoprene is within a certain range produce dried traces having both sufficient conductivity and stretchability.

TABLE 1

| Sample | Ag (g) | Neoprene (g) | Ag:Neoprene (w/w) | Stretchability | Resistance of 5 cm long traces |
| --- | --- | --- | --- | --- | --- |
| S-5 | 23.58 | 6 | 3.9 | good | non-conductive |
| S-6 | 31.44 | 6 | 5.2 | good | MΩ conductivity too low |
| S-7 | 35.37 | 6 | 5.9 | good | KΩ conductivity too low |
| S-4 | 39.3 | 6 | 6.6 | good | Hundreds of Ω fair conductivity |
| S-3 | 55 | 6 | 9.2 | good | Tens of Ω good conductivity |
| S-2 | 52.4 | 5 | 10.5 | non-stretchable | Ω or less good conductivity |

Example 2

To test the ability of the ink to produce a stretchable electronic device, a disposable breathing rate sensor was fabricated by screen printing and drying an ink on a natural rubber substrate and affixing the printed substrate to a non-stretchable strap. The ink consisted of silver nanoparticles, binder and solvent in an ink formulation shown below:

Neoprene particles: 6 g
Solsperse™ 36000 solution: 0.5 g
Tris(nonyphenyl)phosphite (Sigma-Aldrich): 0.75 g
3-(Diethoxymethylsilyl)propylamine: 0.5 g
Vikoflex™ 7170 Epoxidized oil: 2 g
Silver powder (2-4 microns): 55 g
2-Ethylhexyl acetate (Sigma-Aldrich): 20 g The Solsperse™ 36000 is an additive used to help the dispersion of silver particles in the solution, while the 3-(diethoxymethylsilyl)propylamine is an additive employed to improve the adhesion between neoprene and silver.

The non-stretchable strap was wrapped around the waist of a subject just below the diaphragm. Each breathing cycle involved an expansion and contraction of the subject's torso, which caused stretching and relaxation of the printed conductors on the natural rubber substrate. Each breathing cycle induced a periodic change in the resistance of the sensor, which was plotted on a graph as illustrated in FIG. 1. By counting the number of peaks in the graph in FIG. 1, the breathing rate of the subject is obtained. As seen in FIG. 1, the breathing rate of the subject was 14 breaths per minute. It is evident from the graph that no open circuit breaks occurred in the sensor during the entire test, illustrating the ability of the sensor to stretch and relax repeatedly without causing any breaks in the deposited ink traces.

Figure 2:
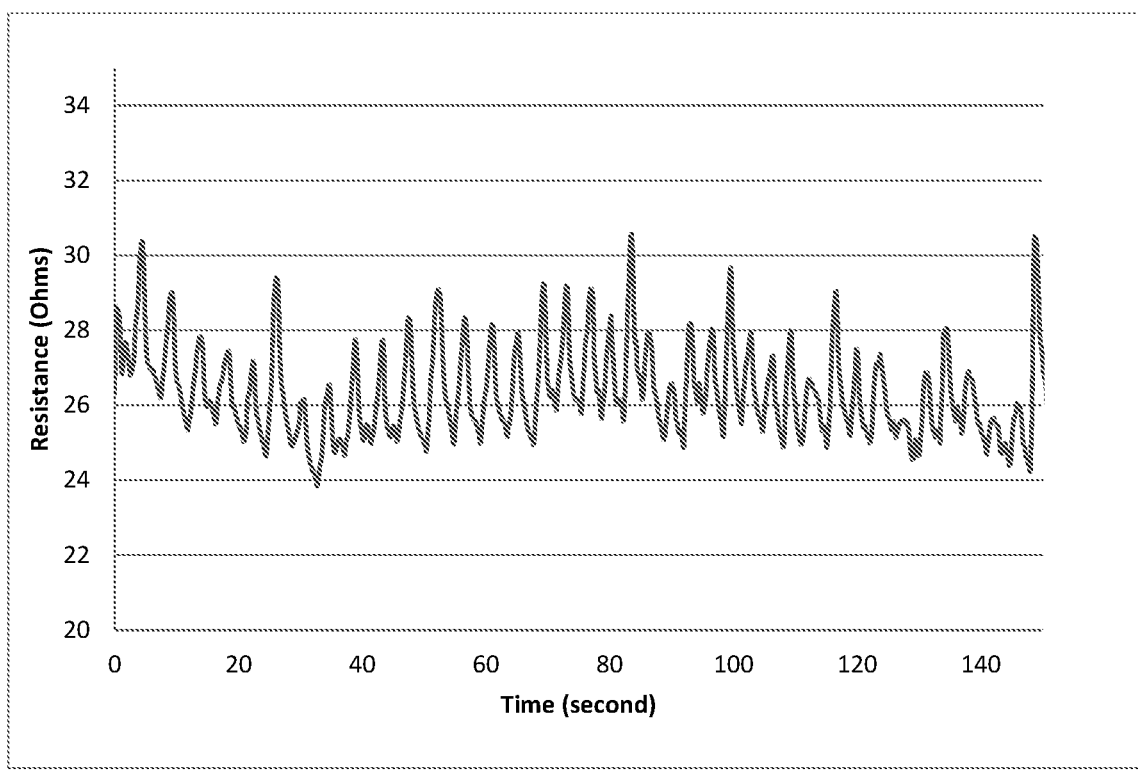
FIG. 2 is a graph of resistance (Ω) vs. time (s) for a breathing rate test of the breathing rate sensor of FIG. 1 attached directly to skin of a subject.

In another test, the disposable breathing rate sensor described above was attached directly to the skin of a subject without the use of a strap. The graph in FIG. 2 illustrates that even attached directly to the skin, the breathing rate sensor performs well throughout the test, with no open circuit breaks during the entire test, further illustrating the reliability and robustness of the sensor under repeated stretching events.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A stretchable and/or flexible conductive ink comprising conductive particles admixed with a binder comprising a neoprene, the conductive particles having a mass in the ink in a range of 6.0 to 10.4 times greater than a mass of the neoprene in the ink, wherein the neoprene is linear, and wherein, when the ink is deposited and dried on a substrate, the substrate comprises a stretchable and/or flexible conductive element thereon, the conductive element formed from the ink.

2. The ink of claim 1, wherein the mass of conductive particles in the ink is 6.4 to 10.0 times greater than the mass of neoprene in the ink.

3. The ink of claim 1, wherein the mass of conductive particles in the ink is 6.6 to 9.2 times greater than the mass of neoprene in the ink.

4. The ink of claim 1, wherein the conductive particles are metal particles.

5. The ink of claim 4, wherein the metal particles are silver particles.

6. The ink of claim 1, wherein an average size of a longest dimension of the conductive particles is in a range of 2,000-4,000 nm.

7. The ink of claim 1, wherein the conductive particles are shaped as flakes, powders or a combination thereof.

8. The ink of claim 1, wherein the binder further comprises one or more additives to improve stability of the ink and/or deposited conductors before and/or after deposition of the ink on a substrate.

9. The ink of claim 1 further comprising a solvent.

10. The ink of claim 1 comprising the conductive particles and the neoprene admixed in a solvent.

11. A substrate comprising a stretchable and/or flexible conductive element thereon, the conductive element produced from the ink as defined in claim 1.

12. The substrate of claim 11, wherein the substrate is a textile.

13. The substrate of claim 12, wherein the conductive element is a sensor, an energy harvester, a near field communication device, a piezoelectric device, a triboelectric device, a thermal device, a battery, a supercapacitor, or a memory.

14. The substrate of claim 12, wherein the conductive element is a respiratory rate sensor.

15. The substrate of claim 12 wherein the substrate is included in a garment.

16. The substrate of claim 11, wherein the conductive element is a sensor, an energy harvester, a near field communication device, a piezoelectric device, a triboelectric device, a thermal device, a battery, a supercapacitor, or a memory.

17. The substrate of claim 16 wherein the substrate is included in a garment.

18. The substrate of claim 11, wherein the conductive element is a respiratory rate sensor.

19. The substrate of claim 18 wherein the substrate is included in a garment.

20. The substrate of claim 11 wherein the substrate is included in a garment.

* * * * *